United States Patent Office 2,810,296
Patented Oct. 22, 1957

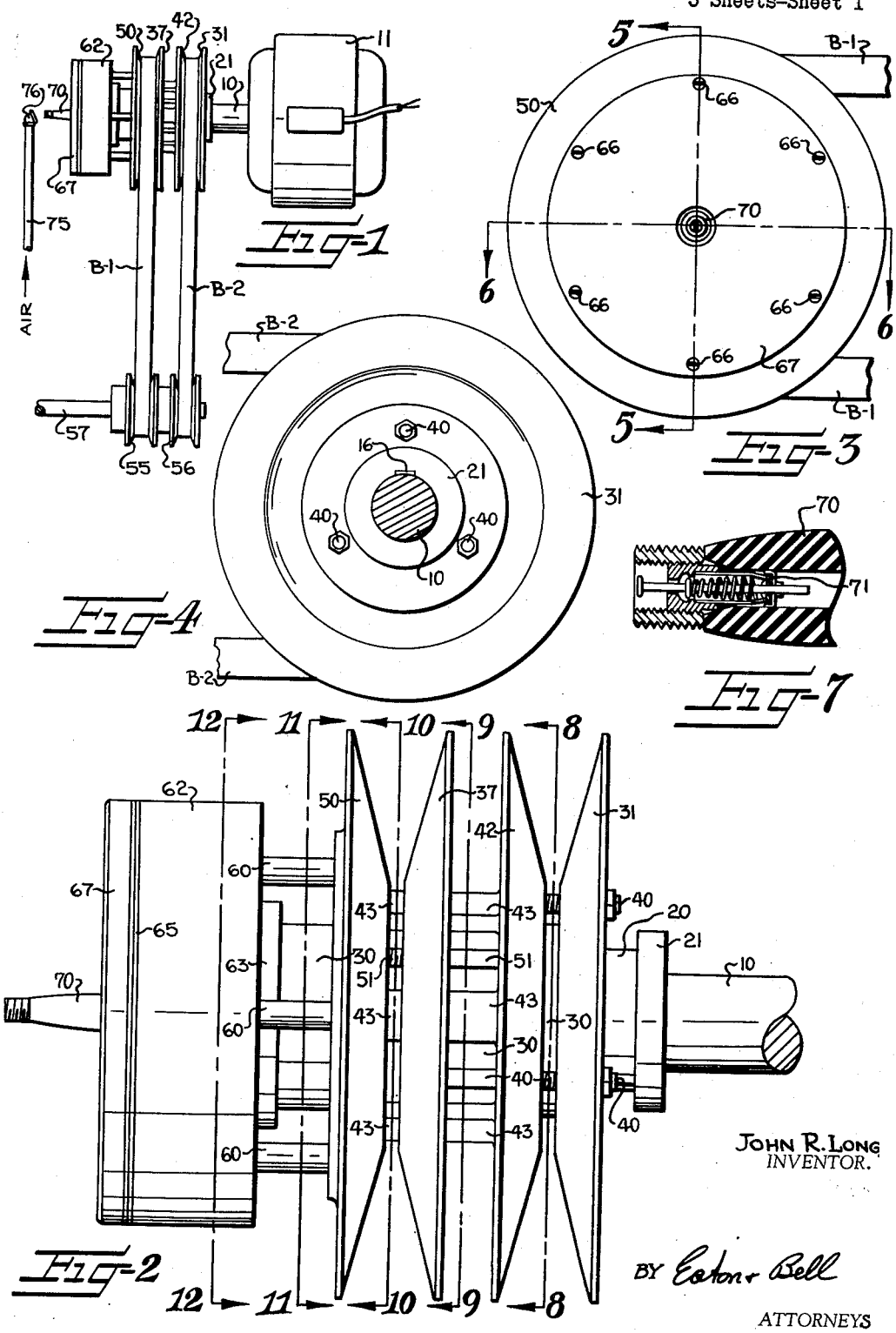

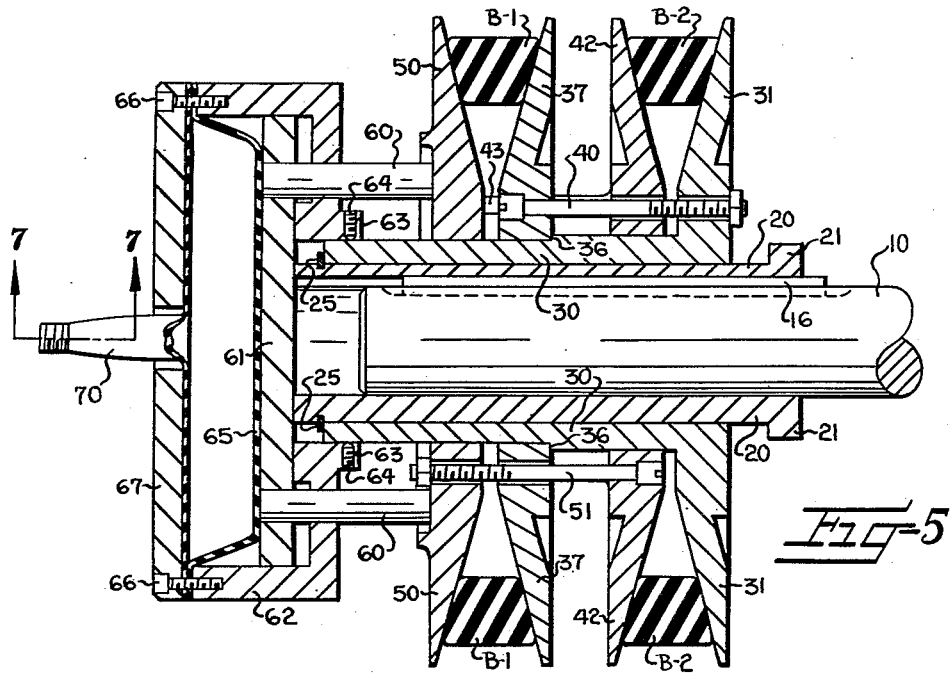

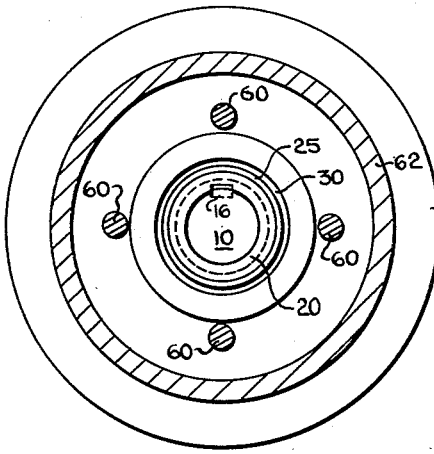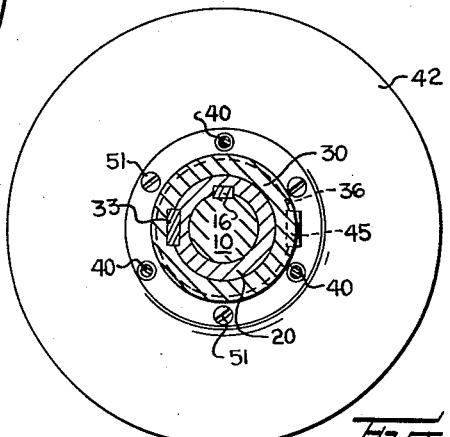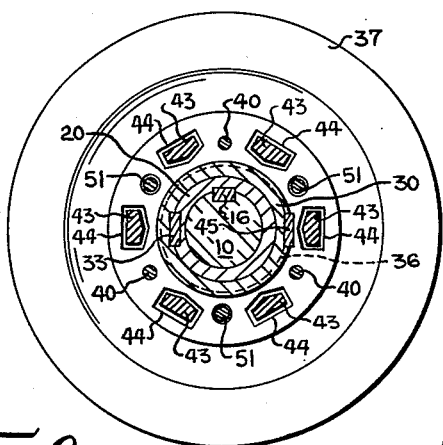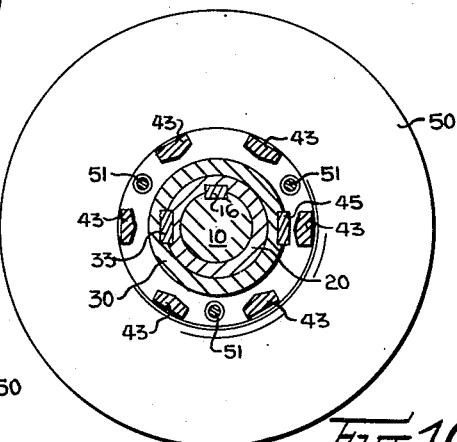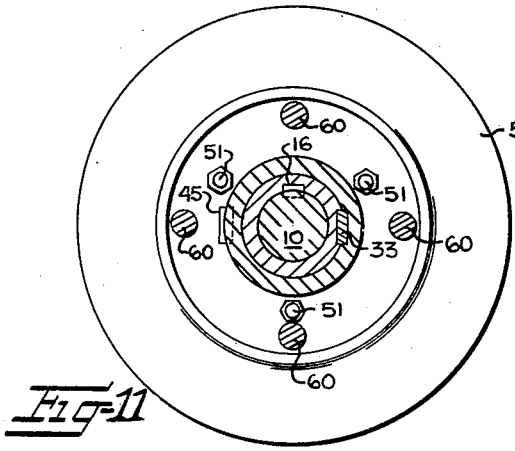

2,810,296

VARIABLE SPEED DRIVE

John R. Long, Hickory, N. C., assignor to Shuford Mills, Inc., Hickory, N. C., a corporation of North Carolina Application March 25, 1954, Serial No. 418,536

4 Claims. (Cl. 74—230.17)

This invention relates to variable speed drives and more particularly to a variable pitch single or multiple pulley V-belt drive, the pulleys of which are self-aligning and slidably movable along a driven shaft upon which they are mounted.

Heretofore, variable speed units have been constructed for driving V-belts wherein the pulleys were adjustable so as to change the driving speed by varying the effective diameter of the pulleys but in all such units of which applicant has knowledge, one or the other of the flanges forming the pulleys have been fixedly secured to the drive shaft thus requiring lateral movement of the V-belt between the flanges upon the diameter of the pulley being varied by varying the space between the pulley or sheave elements.

It is therefore an object of this invention to provide a variable speed drive having a single or multiple pulley and a pneumatically operable piston mounted on a shaft in such a manner as to prevent relative rotational movement between the shaft and the piston or pulleys mounted thereon, and to permit limited longitudinal movement of said piston and pulleys as a unit relative to said shaft for alining purposes.

It is another object of this invention to provide a device of the type described wherein one flange of each of said pulleys is connected to a cylinder in which said piston is disposed and said flange is movable with the cylinder, the other flange of each of said pulleys being interconnected and movable independently of said cylinder in response to movement of said piston within said cylinder to thereby vary the diameter of said pulleys.

More specifically, an object of this invention is to provide an adjustable sheave or pulley comprising at least two flanges mounted on a shaft for rotation therewith and wherein both of said flanges are slidably movable relative to said shaft to vary the distance therebetween and the effective diameter of said pulley. One of said flanges is fixedly connected to a cylinder which is also slidable on the shaft and the other of said flanges is movable relative to said cylinder by means of piston rods extending from said cylinder and connected to a piston disposed within the cylinder and pneumatically operated. Upon movement of said flanges to vary the effective diameter of the pulley, a V-belt positioned therearound will move in a straight perpendicular line relative to the axis of said shaft and will not move or slide laterally resulting in a considerable decrease in the amount of wear in said V-belt.

Some of the objects of the invention having been stated, other objects will appear as the description proceeds, when taken in connection with the accompanying drawings in which—

Figure 1 is a somewhat schematic view of the present invention showing the cylinder and the variable speed drive attached to the shaft of an electric motor;

Figure 2 is an enlarged plan view of the variable speed drive mounted on a shaft but omitting the electric motor and the driven V-belts;

Figure 3 is an elevation on a reduced scale of the left-hand end of the variable speed drive shown in Figure 2;

Figure 4 is an elevation on a reduced scale of the right-hand end of the variable speed drive shown in Figure 2;

Figure 5 is a transverse vertical sectional view taken substantially along the line 5—5 in Figure 3 and showing the pulley flanges in relatively contracted position;

Figure 6 is a transverse sectional plan view taken substantially along the line 6—6 in Figure 3, but showing the pulley flanges in relatively expanded position;

Figure 7 is an enlarged vertical sectional view taken along the line 7—7 in Figure 5;

Figure 8 is a reduced vertical sectional view taken substantially along the line 8—8 in Figure 2;

Figure 9 is a reduced vertical sectional view taken substantially along the line 9—9 in Figure 2;

Figure 10 is a reduced vertical sectional view taken substantially along the line 10—10 in Figure 2;

Figure 11 is a reduced vertical sectional view taken substantially along the line 11—11 in Figure 2;

Figure 12 is a reduced vertical sectional view taken substantially along the line 12—12 in Figure 2.

Referring more specifically to the drawings, the numeral 10 designates a shaft which may be driven by an electric motor 11 connected to a suitable source of electrical energy, not shown, or by any other suitable means. A sleeve 20 is mounted on the shaft 10, said shaft 10 being provided with a keyway (Figure 5) for the reception of a key 16, the upper half of which engages a keyway in the sleeve 20 to prevent relative rotational movement between the shaft 10 and the sleeve 20. The sleeve 20 has a shoulder 21 penetrated by set screws 22 which bear against the shaft 10 to thus prevent axial movement of the sleeve 20 on the shaft 10.

The end portion of the sleeve 20 remote from the shoulder 21 is provided with an annular groove in which a snap ring 25 is adapted to fit, said ring 25 serving as end limiting means for a hub 30 mounted on the sleeve 20. The hub 30 is elongated and may also be termed as a sleeve formed integral with an annular inclined flange 31 which forms one half of the right-hand pulley, said hub 30 being prevented from relative rotation about the sleeve 20 by a key 33 (Figures 6, 8, 9 and 10) which is fixedly secured in a keyway of the sleeve 20 in any suitable manner such as screws 34.

The hub portion 30 of the flange 31 is provided with a reduced outer end portion which forms a shoulder 36 against which an inclined annular flange 37 is held by a plurality of bolts 40 which also penetrate the flange 31, said flange 37 forming one half of the left-hand pulley. Thus, the inclined flanges 31 and 37 are held in fixed spaced relation to each other by the bolts 40 and the shoulder 36 and are prevented from rotational movement relative to the sleeve 20 by the key 33. The key 33 does not prevent longitudinal movement of the hub 30 on the sleeve 20, said hub being freely slidable longitudinally thereof between the shoulder 21 and the snap ring 25.

A mating inclined annular flange 42, having a plurality of openings therethrough slidably penetrated by the connecting bolts 40, forms the other half of the right-hand pulley, said flange 42 being mounted on the enlarged portion of the hub 30 of the flange 31 and slidably movable longitudinally or axially thereof. A plurality of spacing legs 43 are formed integral with the flange 42 (Figures 6, 9 and 10) and extend therefrom through suitable openings 44 in the flange 37 to bear against an inclined annular flange 50 slidably mounted for longitudinal movement on the reduced portion of the hub 30 in mating relation with the inclined annular flange 37 to form the other half of the left-hand pulley.

The flanges 42 and 50 are held together by a plurality of bolts 51 (Figures 5, 10 and 11) which slidably penetrate suitable openings in the flange 37, said flanges 42 and 50 being prevented from rotational movement relative to the hub 30 by a keyway in said hub adapted to receive a key 45 fixed therein as by screws 46.

It is thus seen that the keys 16, 33 and 45 prevent relative rotational movement between the shaft 10 and the pulleys formed by flanges 31, 42 and 37, 50, while at the same time permitting limited longitudinal sliding movement of the pulleys relative to the sleeve 20 fixedly mounted on the shaft 10. It should also be observed that the sleeve 20 with its shoulder 21 and snap ring 25 serve as the means to retain the pulley flanges on the end of the shaft by limiting the movement of the hub or sleeve 30 on which the flanges are mounted.

Suitable V-belts B-1 and B-2 extend partially around the variable pitch pulleys formed by the flanges 31, 42 and 37, 50 and around suitable fixed diameter pulleys 55 and 56 (Figure 1) fixedly mounted on a driven shaft 57, the speed of which may be varied by the variable pitch pulleys formed from the inclined flanges 31, 42, 37 and 50. It is apparent that shaft 57 and pulleys 55, 56 should be so mounted as to move toward and away from said variable pitch pulleys as the effective diameters of said variable pitch pulleys are respectively increased and decreased. Of course, the driven shaft may be mounted in fixed bearings and provided with variable pitch pulleys thereon on which the belts B-1, B-2 may be entrained, if desired, in a manner well known in the art.

The flange 50 is engaged by a plurality of outwardly extending legs or piston rods 60 which may be connected to the flange 50, if desired. The rods 60 are circularly arranged in alternation with the spacing legs 43 (Figure 9) and slidably penetrate the closed inner end of a cylinder or cylinder element 62 and are secured to a piston or piston element 61 slidably movable within the cylinder 62. The cylinder 62 is provided with a closed inner end having a hub portion 63 which is fixedly secured to the reduced portion of the hub or sleeve 30 of the flange 31 by any suitable means such as set screws 64. It is thus seen that the flanges 31 and 37 and the cylinder 62 are so interconnected as to prohibit relative movement therebetween.

The cylinder 62 is also provided with a flexible diaphragm or tube the outer edges of which are secured to the cylinder 62 by a plurality of screws 66 on a cylinder head or cover 67 also held in place by the screws 66. Thus, the cylinder 62 is provided with closed opposite ends. The flexible tube 65 is also provided with a valve stem 70 having a suitable valve 71 therein of conventional or other construction. It is to be understood that, if desired, a rotary connection may be inserted in the cover 67 to permanently connect the flexible tube 65 with a source of air, the input of which may be controlled by a valve, not shown. The use of a rotary connection would facilitate the adjustment of the pulleys during rotation of the same, but such a connection is not essential to the spirit of the invention. The tube 65 could be omitted and air or other fluid pressure means could be introduced directly into the cylinder 62 to operate the piston 61.

Assuming that the variable speed drive is in the position shown in Figure 6, that is, with the V-belts B-1 and B-2 at a point in relatively close proximity to the hub 30 so that the belts B-1 and B-2 may be driven to impart the minimum amount of speed to the pulleys 55 and 56 (Figure 1), any desired increase in speed may be effected by merely admitting air into the flexible tube 65 through a hose 75 having a nozzle 76 thereon adapted to mate with the valve stem 70.

Upon air being admitted to the flexible diaphragm 65, the resultant pressure will force the piston 61 to the right from the position shown in Figure 6 to that shown in Figure 5, thus also moving the rods 60 outwardly through the cylinder 62 against the flange 50 to move the flange 50 as well as the flange 42 closer to the flanges 37 and 31, respectively. It is to be noted that although the interconnection of the flanges 31 and 37 with cylinder 62 prevents the flanges 31 and 37 from being moved by the piston 61, the manner in which the flanges 42 and 50 are slidably mounted on the hub 30 enables them to be moved as described. It is obvious that the closer the flanges 50 and 42 are positioned relative to the respective flanges 37 and 31 the higher the V-belts B-1 and B-2 will climb up the inclined flanges 50, 37 and 42, 31 to thus increase the pitch diameter of the variable speed drive pulleys and to correspondingly increase the speed of the pulleys 55 and 56.

The variable speed drive will then automatically aline itself with the fixed pulleys 55 and 56 so that there is no undue pressure on the sides of the belts B-1 and B-2 since the cylinder 62 and the inclined flanges 31, 42, 37 and 50 are all slidably mounted on the sleeve 20 which is fixed to the drive shaft 10.

In the event that the belts B-1 and B-2 need to have their speed decreased it is merely necessary to depress the valve stem to open the valve 71 (Figure 7) and allow some of the compressed air (the desired amount) to escape through the valve stem 70 to let the piston 61 move to the left from the position shown in Figure 5 to substantially that shown in Figure 6 by the pressure of the belts on the inclined flanges 42 and 50. In this manner the flanges 42, 31 and 37, 50 may be moved apart from each other to decrease the pitch diameter of the variable speed drive pulleys and decrease the speed at which the belts B-1 and B-2 travel.

The sliding feature of the cylinder 62 and the flanges 31, 42, 37 and 50 relative to the sleeve 20 and the shaft 10 permits the variable speed pulleys to aline themselves with the fixed pulleys 55 and 56 simultaneously with any variance in the diameter thereof, thereby eliminating excessive wear of the V-belts B-1 and B-2.

It is thus seen, that I have provided a variable speed drive which is self-alining along the drive shaft and which may be easily and cheaply manufactured. This variable speed drive is also simple of construction and the speed of the belts driven thereby may be easily changed. In order to clearly establish the relationship of the various components of the improved self-alining pulley assembly in the claims, the flanges 31, 37 may be termed as first flanges and the flanges 42, 50 may be termed as second flanges. Also, the flanges 31, 37, 42, 50 may be respectively termed as first, second, third and fourth flanges.

In the drawings and specification there has been set forth a preferred embodiment of the invention and although specific terms are employed, they are used in a generic and descriptive sense only, and not for purposes of limitation, the scope of the invention being defined in the claims.

I claim:

1. A variable speed drive comprising a rotatable shaft, at least one pulley mounted thereon and adapted to have a tensioned V-belt entrained thereabout, said pulley comprising a pair of mating flanges each mounted for independent axial movement on said shaft and fixed against rotation relative to said shaft, a cylinder, a fluid pressure actuated piston within the cylinder, said cylinder and piston being located outwardly of and axially of one end of said shaft, means mounted on the shaft adjacent said one end for retaining said pulley flanges on said end, one of said flanges being secured to the cylinder, and means on said piston contacting the other of said flanges whereby, upon obverse relative movement between the piston and cylinder, the flanges move toward each other and, upon reverse relative movement between the flanges, as effected by the tensioned V-belt, reverse relative movement is effected between the piston and the cylinder.

2. In a variable speed drive according to claim 1 wherein a flexible tube is positioned in the cylinder between the outer end of the cylinder and the piston and means are provided for introducing compressed air into and exhausting compressed air from the tube.

3. A variable speed drive mechanism for a rotatable shaft comprising a pulley adapted to be mounted on said shaft and adapted to have a tensioned V-belt entrained thereabout, said pulley comprising a pair of flanges having inclined proximal surfaces thereon, means to mount said flanges for relative axial movement on said shaft comprising a sleeve mounted for axial movement on one end of said shaft and fixed against rotation relative to said shaft, one of said flanges being fixed on said sleeve, the other flange being loose on said sleeve and fixed against rotation on said sleeve, means mounted on the shaft adjacent said one end for retaining said sleeve and pulley flanges on said end, a cylinder element, a piston element in said cylinder element, said elements being located outwardly of said one end of said shaft and in coaxial relation to said shaft, means connecting one of said elements to the end of the sleeve remote from the flange fixed thereon, means on the other of said elements contacting the other of said flanges, means for introducing fluid pressure into and exhausting fluid pressure from the cylinder element to effect relative movement between the elements to move the flanges toward each other upon introduction of fluid pressure into the cylinder, and to permit the tensioned V-belt to move the flanges away from each other upon fluid pressure being exhausted from the cylinder.

4. A variable speed drive mechanism for a rotatable shaft comprising a pulley adapted to be mounted on said shaft and adapted to have a tensioned V-belt entrained thereabout, said pulley comprising first and second flanges having inclined proximal surfaces thereon, means to mount said flanges for relative axial movement on said shaft comprising a sleeve mounted for axial movement on one end of said shaft and fixed against rotation relative to said shaft, said first flange being fixed on said sleeve, the second flange being loose on said sleeve and fixed against rotation on said sleeve, means mounted on the shaft adjacent said one end for retaining said sleeve and pulley flanges on said end, a cylinder having closed opposite ends, a piston in said cylinder, said cylinder and piston being located outwardly of and axially of said one end of said shaft, means securing one end of said cylinder to the end of the sleeve remote from the first flange, a plurality of legs engaging the face of the second flange opposite from the first flange and loosely penetrating said one end of the cylinder and being attached to said piston, and means for introducing fluid pressure into and exhausting fluid pressure from between the other end of the cylinder and the piston to move the flanges toward each other upon introduction of fluid pressure into the cylinder, and to permit the flanges to be moved away from each other by the V-belt upon exhausting fluid pressure from the cylinder.

References Cited in the file of this patent

UNITED STATES PATENTS

| | | |
|---|---|---|
| 1,035,860 | Conradson | Aug. 20, 1912 |
| 1,545,638 | Clay | July 14, 1925 |
| 2,150,456 | Perrine | Mar. 14, 1939 |
| 2,198,940 | Heyer | Apr. 30, 1940 |
| 2,288,114 | Smith | June 30, 1942 |
| 2,308,868 | Durdin | Jan. 19, 1943 |
| 2,611,277 | Mitchell | Sept. 23, 1952 |
| 2,709,373 | Barron | May 31, 1955 |
| 2,709,374 | Williams | May 31, 1955 |
| 2,714,313 | Gerbing | Aug. 2, 1955 |

FOREIGN PATENTS

| | | |
|---|---|---|
| 1,040,637 | France | May 27, 1953 |

(Corresponding U. S. Patent 2,754,691, July 17, 1956)

| | | |
|---|---|---|
| 12,201 | Great Britain | of 1910 |